United States Patent [19]

Schwartz

[11] 3,916,108

[45] Oct. 28, 1975

[54] TDM COMMUNICATION SYSTEM WITH CENTRALIZED TIME SLOT ADDRESS DISTRIBUTION

[75] Inventor: Norman Larry Schwartz, Stony Brook, Long Island, N.Y.

[73] Assignee: Multiplex Communications, Inc., Hauppauge, N.Y.

[22] Filed: Nov. 9, 1973

[21] Appl. No.: 414,434

[52] U.S. Cl........ 179/15 BA; 179/15 A; 179/15 AL

[51] Int. Cl............................................ H04j 5/00

[58] Field of Search...... 179/15 BA, 15 AQ, 15 AL, 179/15 A

[56] References Cited

UNITED STATES PATENTS

| | | | |
|---|---|---|---|
| 3,544,976 | 12/1970 | Collins | 179/15 AL X |
| 3,643,030 | 2/1972 | Sparrenoahl | 179/15 BA |
| 3,715,505 | 2/1973 | Gordon | 179/15 AQ |

OTHER PUBLICATIONS

IEEE Spectrum; Aug., 1967; "Multiple-Access Discrete-Address Communication Systems" by A. M. McCalmont; pp. 87–94.

*Primary Examiner*—David L. Stewart
*Attorney, Agent, or Firm*—Hopgood, Calimafde, Kalil, Blaustein & Lieberman

[57] ABSTRACT

Each recurring time slot of a time division multiplex communication system is identified by a unique combination of phase relationships among a plurality of synchronization signals. Each of a plurality of terminators provides samples of data input and output to an information path only when a preselected time slot is identified by the simultaneously occurring phase relationship between a plurality of signals of different frequencies carried by a synchronization path.

6 Claims, 2 Drawing Figures

TDM COMMUNICATION SYSTEM WITH CENTRALIZED TIME SLOT ADDRESS DISTRIBUTION

BACKGROUND OF THE INVENTION:

The present invention relates to a time-division multiplex communication system, and more particularly a new and improved communication system in which recurring time slots are each uniquely identified by simultaneously occurring synchronization signals.

Electronic communication systems were at one time based exclusively on space-division techniques. That is, electromagnetic switches were used to establish connections along discreet paths dedicated solely to a particular connection throughout its duration. This required large numbers of interconnecting lines in relation to the total number of system inputs and outputs. Moreover, bulky, slow and expensive servo mechanisms were relied on to establish the desired connections.

With the advent of more sophisticated solid state switching devices has come the use of time division for information transmission. This sampling technique enables a large number of users to communicate over a single line or bus while only selected interconnections among these users are established. The composite signal passing over the time-division line is divided into a series of frames. Each frame is divided into a series of time slots and each time slot occurs once per frame.

All communicating locations must be synchronized to a common time base so that the desired recurring time slots can be reliably identified. Synchronization is most commonly accomplished by a periodically occurring sync signal superimposed on the information carried by the time-division path, the sync pulses being identifiable by a predetermined characteristic such as amplitude superiority. Conventional synchronization techniques often require an oscillator or counter at each user location with periodic correction in response to the sync signals so that errors are not cumulative. A part of the signal-carrying capacity of the system must therefore be dedicated to the sync pulses, thus diminising useful information capacity.

Most presently known time division communication systems are relatively complex and expensive, thus not permitting their usage for many purposes. They are generally predicated on the assumption that only a small percentage of possible user locations will be active at any one time, and the synchronization techniques conventionally employed require relatively elaborate circuitry at each location. When the percentage of possible simultaneous users approaches the total number of users connected to the system, the synchronization information becomes sufficiently complex and voluminous to greatly diminish the capacity of the system to transmit information. Efforts to simplify synchronization have, in the past, succeeded only at the expense of reliability.

SUMMARY OF THE INVENTION

The present invention fills a long-felt need for a comparatively simple and highly reliable time-division communication system. It utilizes one path, which may be called an information path, for carrying recurring time-division samples of the information to be communicated and a separate synchronization path that carries synchronization signals that are used to synchronize input/output devices by which various types of user apparatus, such as computer terminals, may be connected to the system. Supervision signals may be carried by a third separate path.

An oscillator means is provided to generate a continuous recurring series of synchronization pulses which are supplied via the synchronization path to uniquely identify each time slot. According to a preferred arrangement, the oscillator means generates a plurality of signals at different frequencies, and a unique combination of phase relationships among these signals identifies each recurring time slot.

Data input and output to the information path is provided by a plurality of terminator means, each including a comparator means for receiving the signals carried by the synchronization path and for producing a comparator output in response to a preselected synchronization signal. Each terminator also includes gate means of providing a connection between the terminator and the information path in response to each comparator output.

BRIEF DESCRIPTION OF THE DRAWINGS:

For a more detailed understanding of the invention, reference may be made to the description below taken in conjunction with the accompanying drawings wherein.

Figure 1:
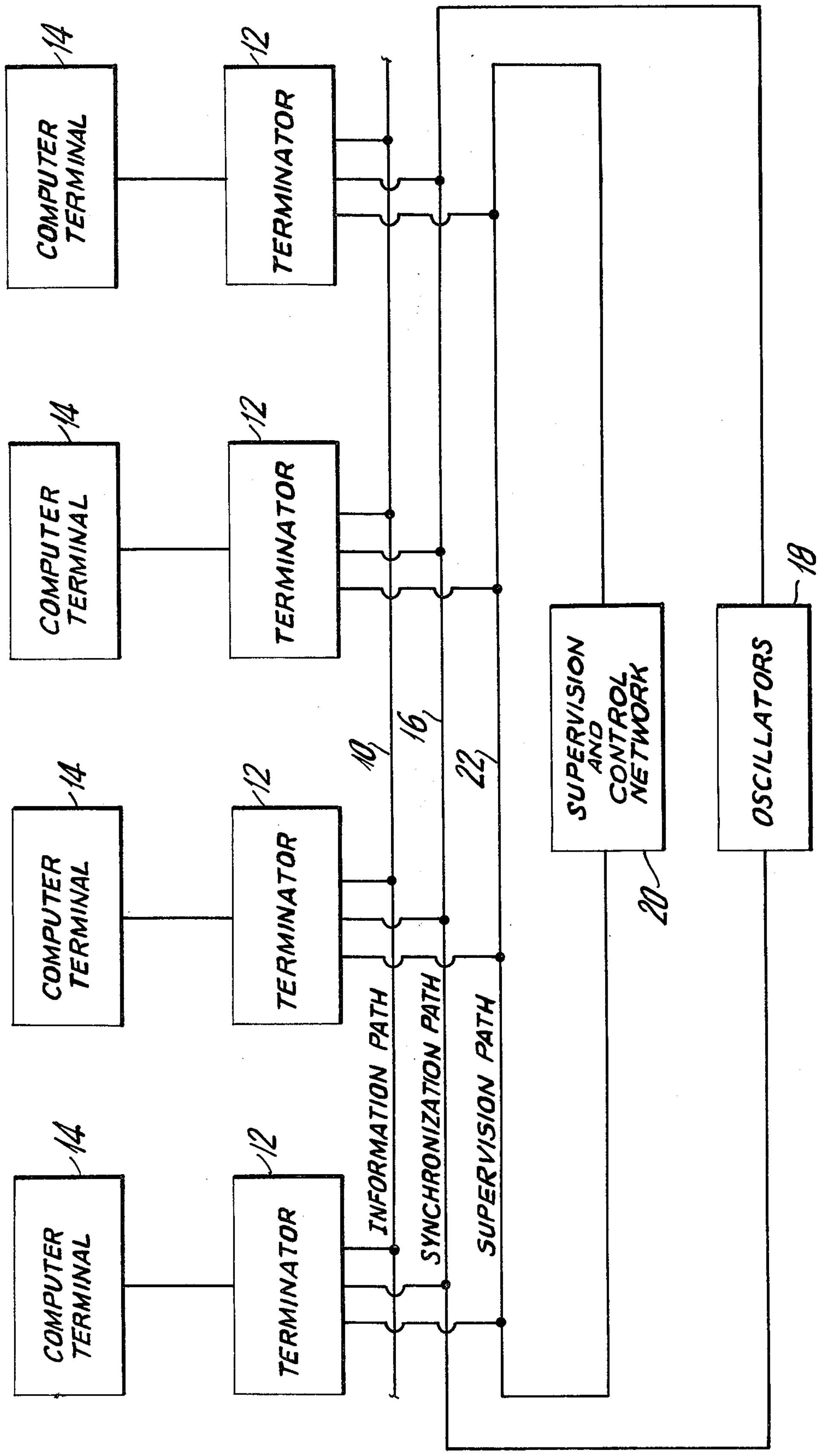
FIG. 1 is a diagram of a time division communication system constructed in accordance with the invention.

DESCRIPTION OF THE PREFERRED EMBODIMENT:

In the communications system of this invention, the information to be communicated is time division multiplexed onto an information path (bus) 10. Input ant output of this multiplexed information is facilitated by a plurality of terminators 12 (four representative terminators being shown in FIG. 1). Each terminator 12 selects the samples pertaining to the connection or connections in which it is taking part by identifying the appropriate recurring time slot or time slots and supplies that information to conventional electronic equipment such as a computer terminal 14.

The terminators 12 are also connected to a synchronization path 16 which carries the output of an oscillator means 18. The output of this oscillator means 18 corresponding in time to any given recurring time slot uniquely identifies that time slot. The oscillator means 18 may comprise a plurality of separate oscillators or a single oscillator connected to conventional frequency dividers or multipliers.

In the preferred embodiment of the invention, the synchronization path 16 comprises a plurality of discrete lines, each of which carries a signal of a different frequency produced by the oscillator means 18. The lowest frequency has a period equal to the length of a complete frame of time slots. The next higher frequency is twice the lowest frequency and each successive higher frequency is twice the one before it. The highest frequency has a period equal to the duration of an individual time slot. Thus each frequency is an integral multiple of the lowest frequency and all synchronization signals are in phase when the lowest frequency commences a new cycle. Each recurring time slot is identified by a unique combination of phase relationships among the signals produced by the oscillator means 18.

At a centralized location, a supervision and control network 20 sets up and tears down connections between the various terminators 12 over commonly assigned time slots. The necessary information is transmitted over a supervision path 22.

Figure 2:
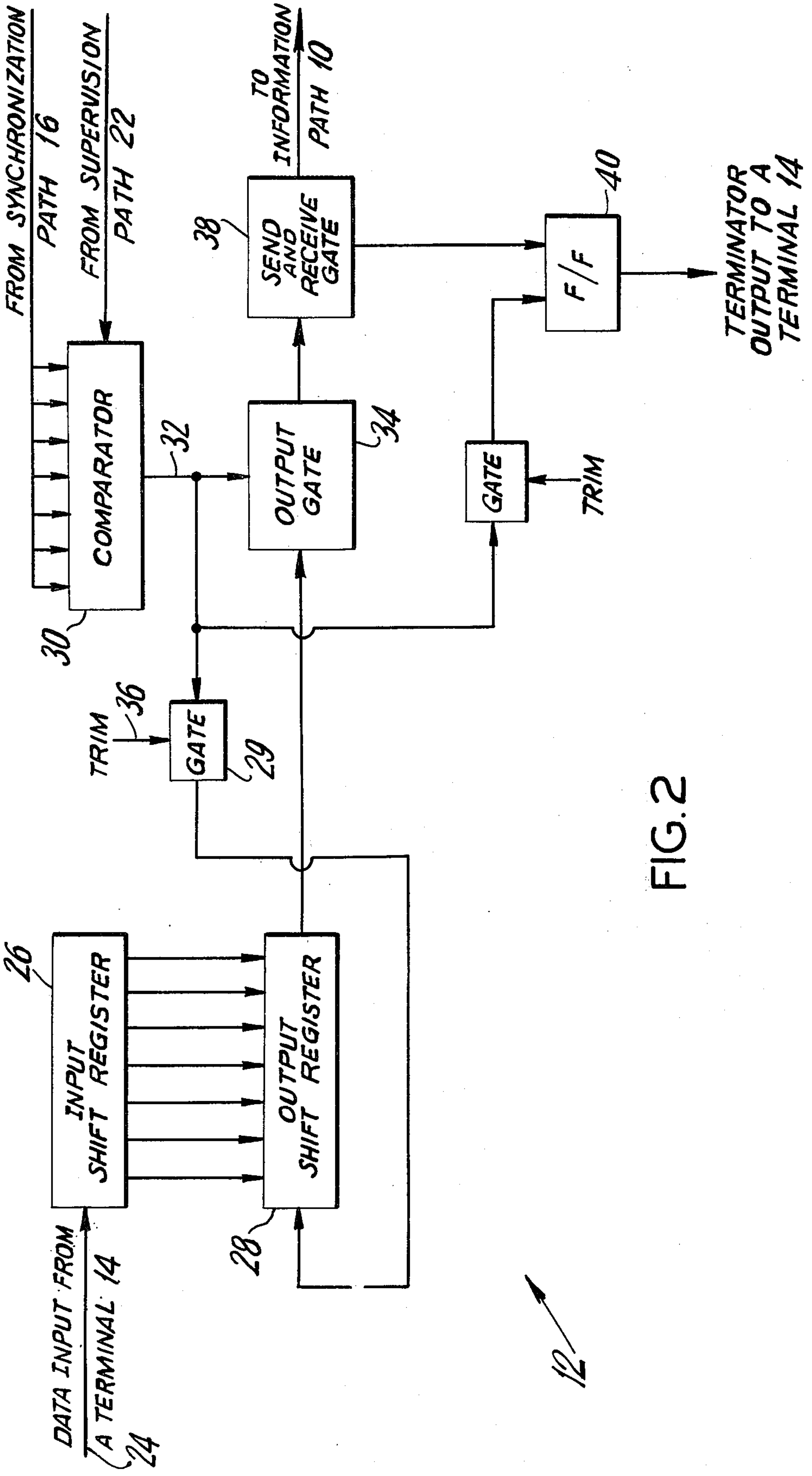
FIG. 2 is a schematic drawing of a representative terminator of the system of FIG. 1.

One of the terminators 12 of FIG. 1 is shown in greater detail in FIG. 2. For synchronization purposes, it includes a comparator 30 which produces an output only in response to a selected signal from the synchronization path 16 indicating the presence of the time slot assigned to that particular terminator by the supervision means 20. Thus, during the occurrence of each time slot, the comparator 30 will receive a series of inputs from the synchronization path 16. However, only during one particular recurring time slot will the phase relationship of the signals produced by the oscillator means 18 coincide with the combination to which the comparator 30 is responsive. When this unique combination occurs, the comparator 30 produces an output on a line 32.

The comparator 30 can be set to be responsive to any desired combination of synchronization signals by a latching signal supplied by the supervision path 22. This latching signal latches or sets the comparator 30 at the combination of phase relationships simultaneously produced by the oscillator means 18. Thus, the desired time slot can be fully identified to the terminator 12 by the timing of the latching signal without reference to any other variable thereby greatly simplifying the supervision function.

The output of the comparator 30 enables the gate 29 to activate the output shift register 28, causing the next successive data bit therein to be supplied to an output gate 34, also enabled by the comparator 30. The function of the gate 29 is to trim the data samples to avoid interference or crosstalk between adjacent time slots. Accordingly, the gate 29 receives trimed pulses via a line 36, which may be transmitted over the synchronization path 16 or the supervision path 22. The trim pulses are supplied to the gate 29 of each terminator 12 simultaneously, but the gate 29 will not be enabled unless there is a simultaneous comparator output on the line 32.

Samples from the output gate 34 pass through a conventional send and receive gate 38 to the information path 10. The gate 38 blocks information received from the information path 10 if there is an output from the output gate 34; otherwise, input data is supplied from the send-receive gate 38 to a flip-flop 40 which, in this embodiment, indicates by its high or low state of the binary character of the sample.

The structure of this communication system is particularly suited to an arrangement in which each terminator is permanently assigned to a particular recurring time slot and in which the bit length of binary information transmitted is equal to the duration of an individual time slot. This greatly simplifies the system, permits all terminators to have access to the information path simultaneously, and requires a minimum sacrifice in capacity, especially if it is expected that each terminator will be in use during a large portion of the time that the system is operative.

Samples of data to be input to the information path 10 by a particular terminator 12 are received from a computer terminal 14 via a line 24. These samples are accumulated in an input shift register 26. When the register 26 is full, its contents is transferred to an output shift register 28. When information is present in the output shift register 28, it is clocked out at predetermined intervals in response to signals from a gate 29 in a manner explained below. The use of the shift registers 26 and 28 enables the terminator 12 to input information sampled to the information path 10 at a predetermined rate during transmitting intervals, even though this information may be supplied by the terminal 14 at a slower or erratic rate.

The above-described embodiment is intended to operate at a predetermined sampling rate which coincides with the frequency with which a particular time slot recurs. It is, however, possible to make the system transparent, i.e., useable with a random or unknown sampling rate, provided that the maximum information frequency does not approach too closely the frequency with which time slots recur. In a transparent system, the shift registers 26 and 28 can be eliminated.

The above-described embodiment of the invention is intended to be merely exemplary and does not limit the scope of the inventive concept. Numerous variations and modifications within the spirit and scope of the invention will occur to those skilled in the art.

I claim:

1. A time division multiplex communication system comprising:

an information path for carrying samples of signals transmitted within selected time slots recurring at a predetermined frequency;

a synchronization path for carrying synchronization signals which separately identify each time slot as it occurs;

oscillator means for generating a recurring series of synchronization signals supplied to the synchronization path, each signal uniquely identifying a simultaneously occurring time slot;

a plurality of terminator means for providing data inputs to the information path and receiving data outputs from the information path, each terminator including comparator means for receiving the signals carried by the synchronization path and for periodically producing a comparator output in response to the occurrence of a preselected synchronization signal combination, and each terminator further including gate means for providing a connection between that terminator and the information path in response to each comparator output; and latching means included in each terminator connected to a supervision path and responsive to latching signals carried thereon for setting the comparator means to be responsive to a synchronization signal occurring simultaneously with the latching signal.

2. The communication system of claim 1, wherein the oscillator means produces a plurality of signals of differing frequencies, each recurring time slot being identified by a unique combination of phase relationships occurring among said signals.

3. The communication system of claim 1, wherein the oscillator means produces a plurality of signals of different frequencies, the lowest frequency being at least equal to the frequency with which each time slots recurs, each recurring time slot being identified by a unique combination of phase relationships among said signals.

4. The communication system of claim 3, wherein the highest frequency produced by said oscillator means is at least equal to the frequency with which each time slot recurs multiplied by the number of recurring time slots.

5. The communication system of claim 1, wherein the oscillator means produces a plurality of signals of different frequencies, the lowest frequency being at least equal to the frequency with which each time slot recurs, each recurring time slot being identified by a unique combination of phase relationships among said frequencies, and the synchronization path including at least one discrete line dedicated to each frequency produced by the oscillator means.

6. A time-division multiplex communication system comprising:

an information path for carrying samples of signals transmitted within selected time slots recurring at a predetermined frequency;

oscillator means for generating a plurality of signals at different selected frequencies, the lowest frequency being equal to the frequency with which each time slot recurs and the highest frequency being equal to the frequency at which each time slot recurs multiplied by the number of recurring time slots, whereby each recurring time slot is identified by a unique combination of phase relationships among said signals;

a synchronization path connected to said oscillator means formed by a plurality of separate lines each of which carries at least one of the frequencies produced by said oscillator means;

a plurality of terminator means for providing data inputs to the information path and receiving data outputs from the information path, each terminator including comparator means for receiving the signals carried by the synchronization path and for periodically producing a comparator output in response to the occurrence of a preselected synchronization signal, said synchronization signal being preselected in response to a latching signal occurring simultaneously with the supply of said synchronization signal by said synchronization path, each terminator means further including gate means for providing a connection between that terminator and the information path in response to each comparator output; and a supervision path connected to each terminator by which latching signals are supplied thereto.

* * * * *